United States Patent
Kudoh et al.

(10) Patent No.: US 12,030,066 B2
(45) Date of Patent: Jul. 9, 2024

(54) PAINT DISCHARGING NOZZLE

(71) Applicants: Satoshi Kudoh, Miyagi (JP); Shohei Ozawa, Miyagi (JP); Keiko Maruyama, Miyagi (JP); Shusei Murai, Tokyo (JP)

(72) Inventors: Satoshi Kudoh, Miyagi (JP); Shohei Ozawa, Miyagi (JP); Keiko Maruyama, Miyagi (JP); Shusei Murai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 169 days.

(21) Appl. No.: 17/498,848

(22) Filed: Oct. 12, 2021

(65) Prior Publication Data
US 2022/0111406 A1   Apr. 14, 2022

(30) Foreign Application Priority Data

Oct. 14, 2020   (JP) .................................. 2020-173141

(51) Int. Cl.
*B05B 1/30*   (2006.01)
*F16C 17/04*  (2006.01)

(52) U.S. Cl.
CPC ............ *B05B 1/3046* (2013.01); *F16C 17/04* (2013.01)

(58) Field of Classification Search
CPC ...... B05B 1/3046; F16C 29/04; F16C 29/045; F16C 29/046
USPC ................................ 239/583–585.5; 384/49
See application file for complete search history.

(56) References Cited

U.S. PATENT DOCUMENTS

| 4,628,330 A |   | 12/1986 | Suga et al. |
| 5,236,264 A | * | 8/1993 | Matsubara ............... F16C 29/04 384/49 |
| 5,945,160 A |   | 8/1999 | Kobak et al. |
| 6,073,911 A | * | 6/2000 | Reiter ................. F02M 51/0671 251/324 |

(Continued)

FOREIGN PATENT DOCUMENTS

| GB | 2014795 A | 8/1979 |
| JP | S55-49273 | 4/1980 |

(Continued)

OTHER PUBLICATIONS

Extended European Search Report issued Mar. 1, 2022 in European Patent Application No. 21201987.1, 9 pages.

*Primary Examiner* — Jason J Boeckmann
(74) *Attorney, Agent, or Firm* — XSENSUS LLP

(57) ABSTRACT

A disclosed paint discharging nozzle is designed for discharging paint supplied at a predetermined pressure. The paint discharging nozzle includes a housing having a nozzle hole through which paint is discharged; a paint chamber configured to supply paint to the nozzle hole; a needle valve retractably or advancingly fitted into the housing to close or open the nozzle hole; a driving mechanism disposed in the housing and configured to cause the needle valve to perform a retracting or advancing operation with respect to the nozzle hole; and a bearing disposed to surround the needle valve within the housing to be in sliding contact with a peripheral surface of the needle valve as the retracting or advancing operation of the needle valve is performed, wherein the bearing is movable in an axial direction of the needle valve.

12 Claims, 5 Drawing Sheets

(56) References Cited

U.S. PATENT DOCUMENTS

| | | | |
|---|---|---|---|
| 6,170,767 | B1 | 1/2001 | Herold et al. |
| 8,801,131 | B2 | 8/2014 | Kaiba et al. |
| 8,936,336 | B2 | 1/2015 | Yokomaku |
| 9,033,464 | B2 | 5/2015 | Kaiba et al. |
| 10,130,970 | B2 * | 11/2018 | Groene ................ B05B 1/3046 |
| 10,339,430 | B2 | 7/2019 | Kaiba et al. |
| 10,691,987 | B2 | 6/2020 | Kaiba et al. |
| 10,737,490 | B2 | 8/2020 | Kaiba et al. |
| 10,987,927 | B2 | 4/2021 | Kaiba et al. |
| 11,003,964 | B2 | 5/2021 | Kaiba et al. |
| 2012/0105522 | A1 | 5/2012 | Wallsten et al. |
| 2020/0023580 | A1 | 1/2020 | Kaiba et al. |
| 2020/0031117 | A1 | 1/2020 | Kaiba et al. |

FOREIGN PATENT DOCUMENTS

| | | |
|---|---|---|
| JP | 2004-142382 | 5/2004 |
| JP | 2014-162221 | 9/2014 |
| JP | 2015-027636 | 2/2015 |
| JP | 2019-056419 A | 4/2019 |
| WO | 2013/089918 A1 | 6/2013 |

* cited by examiner $A+B>L\cdot\pi$

PAINT DISCHARGING NOZZLE

CROSS-REFERENCE TO RELATED APPLICATION

The present application is based on and claims priority under 35 U.S.C. § 119 to Japanese Patent Application No. 2020-173141, filed on Oct. 14, 2020, the content of which is incorporated herein by reference in its entirety.

BACKGROUND OF THE INVENTION

1. Field of the Invention

The disclosures discussed herein relate to a paint discharging nozzle.

2. Description of the Related Art

In the automobile manufacturing process, for example, when two colors of painting (called "2-tone painting") are applied to the surface of the automobile body, the paint is sprayed in the form of mist by a spray gun. Thus, the automobile body is masked and then the paint is sprayed to the masked surface of the automobile body by a spray gun to define a boundary line.

RELATED ART DOCUMENTS

Patent Documents

[Patent Document 1] Japanese Patent Application Laid-Open No. 2015-027636
[Patent Document 2] Japanese Patent Application Laid-Open No. 2004-142382

SUMMARY OF THE INVENTION

According to the present embodiment, a paint discharging nozzle includes:
 a housing having a nozzle hole through which paint is discharged;
 a paint chamber configured to supply paint to the nozzle hole;
 a needle valve retractably or advancingly fitted into the housing to close or open the nozzle hole;
 a driving mechanism disposed in the housing and configured to cause the needle valve to perform a retracting or advancing operation with respect to the nozzle hole; and
 a bearing disposed to surround the needle valve within the housing to be in sliding contact with a peripheral surface of the needle valve as the retracting or advancing operation of the needle valve is performed, wherein the bearing is movable in an axial direction of the needle valve.

DETAILED DESCRIPTION OF THE PREFERRED EMBODIMENTS

In the related art described above, the masking of the automobile body and removing the mask after painting is burdensome and the work efficiency is decreased. In order to handle such drawbacks, attention has been attracted to a method of defining a boundary line without masking by using a paint discharging nozzle with a narrow spray width.

Patent Document 1 discloses, for example, an application device having a paint discharging nozzle. The application (print) device disclosed in Patent Document 1 includes a head array (paint discharging nozzle head). The head array includes a plurality of paint discharging nozzles disposed in array to inject compressed air and apply high pressure to the ink tank filled with paint to discharge the paint to a remote area.

The application device further includes a linear rail for moving the head array back and forth in a linear manner, a multi-articulated robot for moving the linear rail by a robot arm, and a controller for controlling the driving of the robot and the paint discharging nozzle. In the head array, a plurality of nozzles arranged in a horizontal array discharges each paint color from each nozzle while moving (scanning) on the linear rail in the array direction.

Such an application device discharges the paint from a plurality of nozzles arranged in a linear manner along the scan direction, so that a film with a desired thickness can be formed by a small amount of scanning operation, and an application operation can be performed at a high-speed application operation involving boundary lines without performing a masking process.

Figure 6:
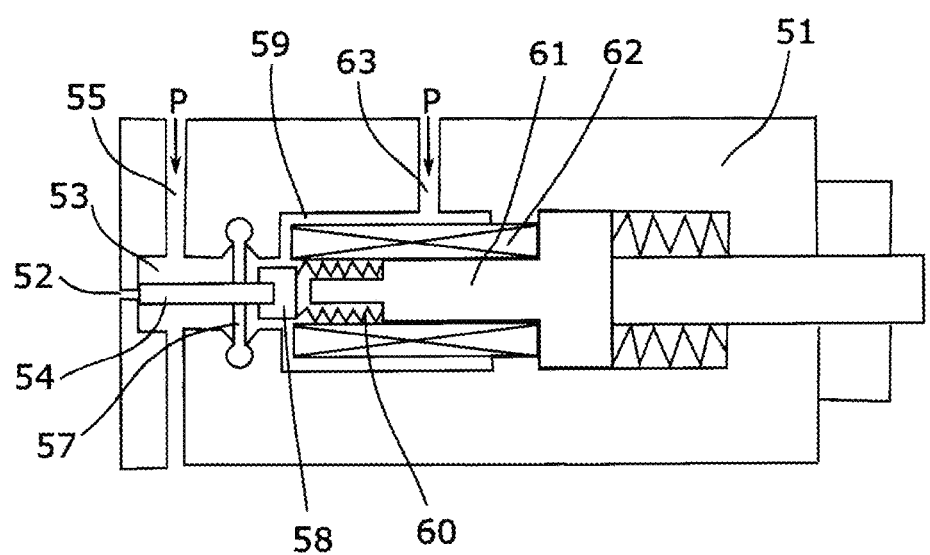
FIG. 6 is a cross-sectional diagram illustrating a configuration of a related art paint discharging nozzle.

Patent Document 2 discloses, for example, the structure of a related art paint discharging nozzle. FIG. 6 is a cross-sectional diagram of a paint discharging nozzle disclosed in Patent Document 2. In FIG. 6, the paint discharging nozzle includes a housing 51 provided with a nozzle hole 52 in the front surface of the housing 51, a paint chamber 53 for supplying paint to the nozzle hole 52, and a needle valve 54 disposed in the paint chamber 53 and having a tip end for closing or opening the nozzle hole 52. The paint discharging nozzle further includes, as a driving mechanism (piezoelectric element) of the needle valve 54, a movable core 58 secured to a rear side of the needle valve 54, a fixed core 61 disposed at an opposite side of the movable core 58, a solenoid 62, and a spring member 60 disposed between the movable core 58 and the fixed core 61.

An elastic diaphragm 57 is disposed in a driving mechanism housing space 59 for housing the driving mechanism to enclose the needle valve 54 in order to prevent the paint in the paint chamber 53 from flowing outside, and pressure P is applied to the paint in the paint chamber 53 through a paint input passage 55. A pressure P equivalent to the pressure applied to the paint through a pressurized passage 63 is applied to a gas or liquid in the driving mechanism housing space 59 to prevent the pressurized paint from leaking between the elastic diaphragm 57 and the needle valve 54.

FIG. 6 illustrates the needle valve 54 closing the nozzle hole 52. In this case, since no electric current is applied to the solenoid 62, the action of the spring member 60 pushes forward the movable core 58 and the subsequent needle valve 54, thereby closing the nozzle hole 52. By contrast, when electric current is applied to the solenoid 62, the movable core 58 is adsorbed to the fixed core 61, and the needle valve 54 moves backward to open the nozzle hole 52.

However, when vaporizing paint floating in the air in an automobile painting line intrudes into the driving mechanism (piezoelectric element), and a spark is generated by friction from the driving mechanism, there may be a risk that the vaporized paint that intrudes into the driving mechanism would ignite and explode, thereby destroying the elastic diaphragm 57 and causing fire to spread to the paint chamber 53.

Extensive studies have been conducted on the assumption that the needle valve is fitted into the housing in a retractable manner. Accordingly, it is an object of the present invention to provide a paint discharging nozzle capable of preventing the paint chamber from being ignited from the driving mechanism.

It should be noted that the distance at which the bearing can be moved axially of the needle valve is preferably at least a circumferential length of the bearing sphere or roller. Further, a drive pin having one end connected to the end of the needle valve on the driving mechanism side may be provided, and the other end of the drive pin may be connected to the driving mechanism.

As described above, a bearing disposed around the needle valve slides on the needle valve to move the bearing in the axial direction. This configuration enables spreading of the grease on the balls or rollers of the bearing to prevent the grease from drying out. In addition, the gap between the needle valve and the inner wall of the housing can be limited to a small size. This configuration can prevent the inflow of vaporized paint into the driving mechanism, can prevent vaporized paint from flowing out of the driving mechanism, and can prevent ignition in the paint chamber upon a spark being generated in the driving mechanism.

Hereinafter, an embodiment of a paint discharging nozzle according to the present invention will be described with reference to the accompanying drawings. The paint discharging nozzle according to the present embodiment is used, for example, in an application device in an automobile manufacturing line, and is configured to discharge paint, such as 2 tone painting (having a boundary with the other color of painting).

Figure 1:
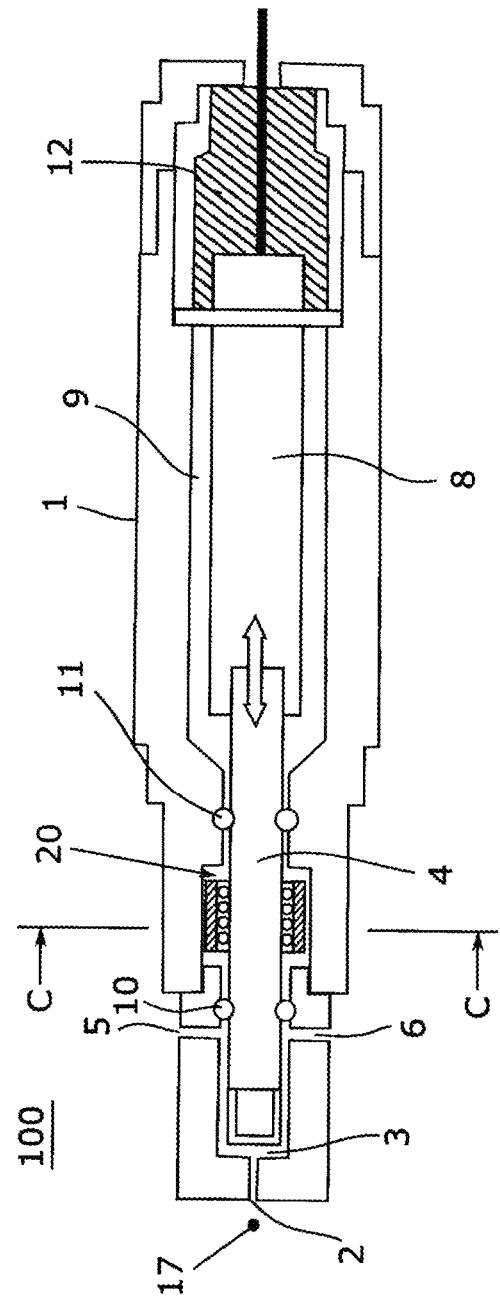
FIG. 1 is a block diagram schematically illustrating a main configuration of a paint discharging nozzle according to a present embodiment.

FIG. 1 is a block diagram schematically illustrating a main configuration of a paint discharging nozzle according to the present embodiment. The paint discharging nozzle 100 includes a housing 1 provided with a nozzle hole 2, a paint chamber 3 configured to supply paint to the nozzle hole 2, a needle valve 4 fitted into the housing 1 such that the needle valve 4 is able to retract or advance and configured to close or open the nozzle hole 2, and a piezo-element 8 as a driving mechanism connected to the needle valve 4.

A paint input passage 5 is connected to a side of the paint chamber 3, and a paint collection passage 6 is connected to the opposite side of the paint chamber 3. The paint is constantly supplied to the paint chamber 3 from the paint supply unit (not illustrated) through the paint input passage 5, and the paint supplied to the paint chamber 3 is collected through the paint collection passage 6. This configuration enables the paint chamber 3 to be filled with paint without congestion of the paint. When the nozzle hole 2 is in the closed state, the predetermined pressure is maintained in the paint chamber 3 by adjusting the rate at which the paint flows from the paint input passage 5.

The piezo-element 8 is configured to change an axial length of the needle valve 4 to move the needle valve 4 toward the nozzle hole 2 (advanced) and to close the nozzle hole 2 with the tip end of the needle valve 4 (the nozzle hole closed state), in response to a predetermined voltage or more being applied to the piezo-element 8 by a voltage applying unit (not illustrated).

By contrast, the piezo-element 8 deforms in a direction in which the needle valve 4 moves away from the nozzle hole 2 to move the tip end of the needle valve 4 away from the nozzle hole 2 (the nozzle hole open state) in response to the applied voltage being lowered from the voltage in the nozzle hole closed state. When the nozzle hole 2 is opened, droplets 17 are discharged from the nozzle hole 2 toward a workpiece by the pressure inside the paint chamber 3 as illustrated in FIG. 1.

The piezo-element 8 is housed in a driving mechanism housing space 9 formed inside the housing 1, and a resin 12 is filled in the driving mechanism housing space 9 at an end opposite to the nozzle hole 2 side in the axial direction of the needle valve 4, thereby insulating the lead-in electric wire to the piezo-element 8. The driving mechanism housing space 9 is separated from the paint chamber 3 via double O-rings 10 and 11 so as not to allow the paint in the paint chamber 3 to flow out into the driving mechanism housing space 9.

Figure 2:
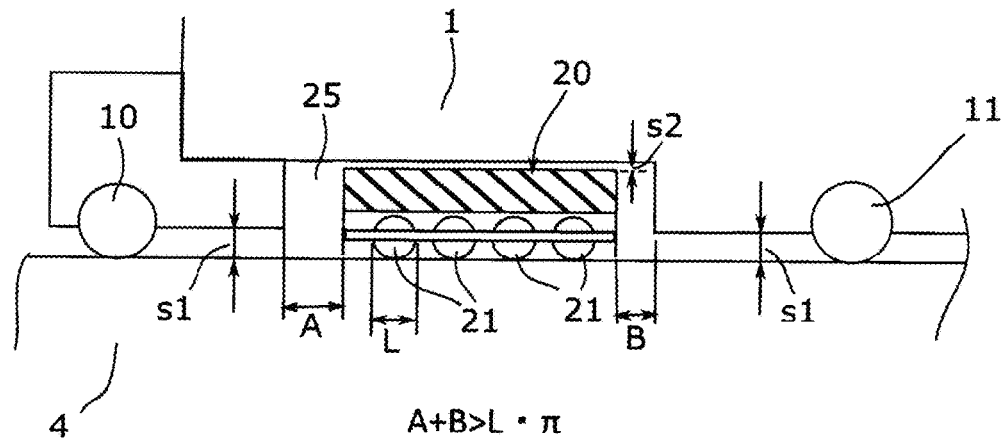
FIG. 2 is a partially enlarged cross-sectional diagram of the periphery of the paint discharging nozzle in FIG. 1 including a linear guide.
Figure 3:
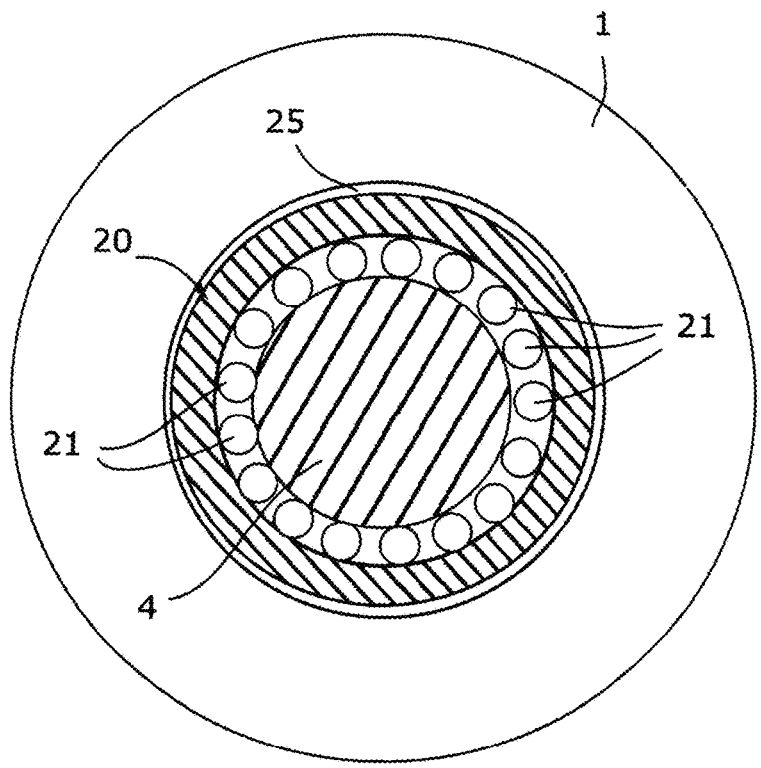
FIG. 3 is a cross-sectional diagram (a cross-sectional diagram cut along a C-C arrow in FIG. 1) illustrating the linear guide in FIG. 2 viewed from the front side.

Further, as illustrated in the drawing, a linear guide 20 made by a bearing is disposed around the needle valve 4 in a radial direction between the O-rings 10 and 11. FIG. 2 is an enlarged cross-sectional diagram illustrating a peripheral portion of the linear guide 20 including the linear guide 20, and FIG. 3 is a cross-sectional diagram (a cross-sectional diagram cut along a C-C arrow in FIG. 1) illustrating the linear guide 20 viewed from the front side. As noted above, the needle valve 4 is advancingly or retractably fitted into the housing 1 in a forward or a backward direction. A space s1 is set between the needle valve 4 and an inner wall of the housing 1 so that the needle valve 4 can be moved in the axial direction, and the paint chamber 3 and the driving mechanism housing space 9 can be isolated by the O-rings 10 and 11. A space s2 is set between the linear guide 20 and the inner wall of the housing 1.

The linear guide 20 is rotatably disposed with a plurality of rigid spheres 21 in an axial direction and in a circumferential direction, respectively. Each of the rigid spheres 21 is disposed to rotate smoothly with a grease, and the plurality of rigid spheres 21 is configured to rotate as the needle valve 4 moves in an axial direction while supporting a circumferential surface of the needle valve 4, thereby maintaining the rectlinearity of the needle valve 4. Since the linear guide 20 slides with respect to the needle valve 4 via the bearing, sparks are not generated. Accordingly, the paint discharging nozzle 100 is safe.

The linear guide 20 is disposed in a cylindrical space 25 such that the linear guide 20 is movable in an axial direction within the cylindrical space 25. As illustrated in FIG. 2, play (backlash) A+B in an axial direction within space 25 is configured to have a length of at least L×n, where L is the diameter of the rigid sphere 21. In this manner, the linear guide 20 axially moves by the length of A+B to distribute the grease throughout the rigid spheres, thereby preventing a shortage of grease.

Figure 4A:
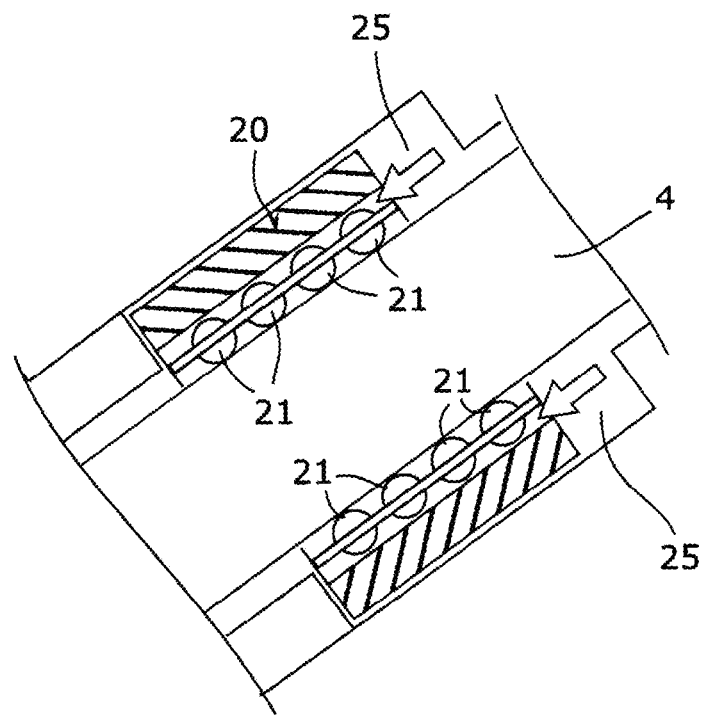
FIGS. 4A and 4B are cross-sectional diagrams illustrating different states of the linear guide in FIG. 2.
Figure 4B:
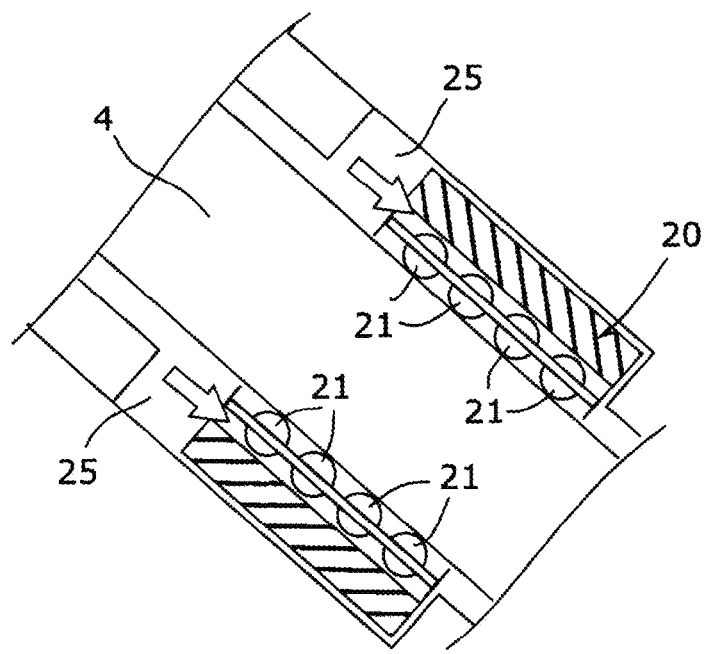

When the paint discharging nozzle 100 is used, the paint discharging nozzle 100 is held at the tip end of a robot arm (not illustrated) to discharge the paint toward a workpiece. However, when the tip end of the nozzle is turned upward or downward at a time before and after discharge, the linear guide 20 is moved axially by the weight of the linear guide 20 itself within the space 25 as illustrated in FIGS. 4A and 4B. As a result, the grease can be easily distributed to all the rigid spheres.

As described above, according to the embodiment of the present invention, a linear guide 20 (bearing) is disposed around the needle valve 4 to allow the linear guide 20 (bearing) to slide on the needle valve 4. According to this configuration, it is possible to maintain the rectlinearity of the needle valve 4, and improve the painting accuracy even if the needle valve 4 is advancingly and retractably fitted into the housing 1, that is, even if the distance between the needle valve 4 and the inner wall of the housing 1 is restricted to a small amount. In addition, the linear guide 20 is disposed within the space 25 in the housing 1, and an axial play (a backlash) equal to or longer than the circumference of a rigid sphere 21 is provided within the space 25 in the housing 1. This configuration enables the linear guide 20 to move by the weight of the linear guide 20 itself, thereby spreading the grease on all the rigid spheres 21, and preventing the grease from drying out. Further, since the gap between the needle valve 4 and the inner wall of the housing 1 is limited to a small amount, it is possible to prevent the vaporizing paint from flowing toward the driving mechanism side. This can prevent ignition in the paint chamber 3 when sparks are generated in the driving mechanism side.

According to the aforementioned embodiment, a member on which the needle valve 4 slides in the linear guide 20 is defined as a rigid sphere 21. However, in the present invention, the member is not limited thereto, but may be a roller, such as a disk or a cylinder, other than a sphere.

Figure 5:
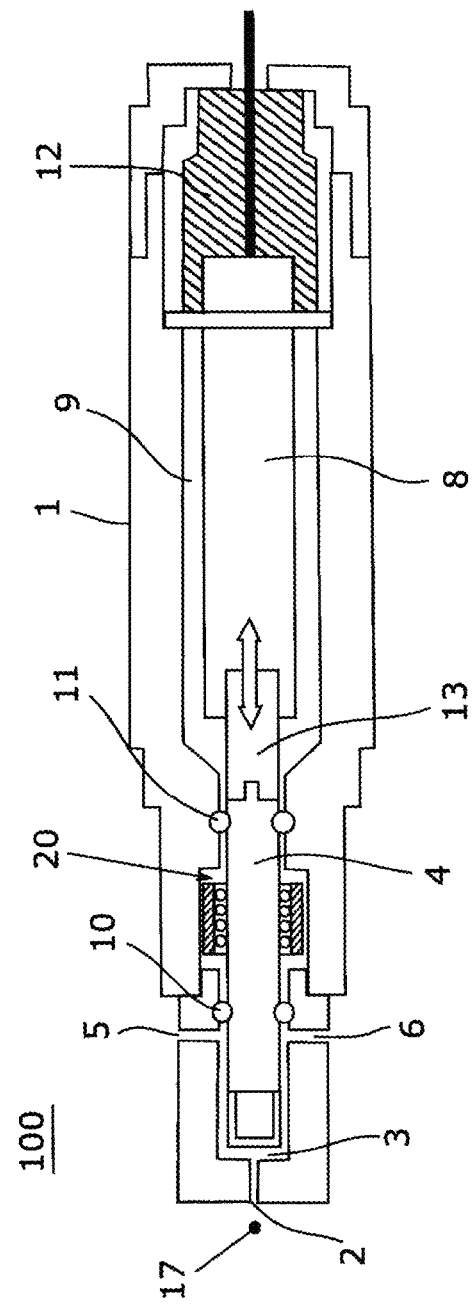
FIG. 5 is a cross-sectional diagram illustrating a modification of the paint discharging nozzle according to the present embodiment.

According to the aforementioned embodiment, the piezo-element 8 (driving mechanism) is connected to the rear end of the needle valve 4, but the present invention is not limited to this configuration. For example, as illustrated in FIG. 5, a drive pin 13 may have one end connected to the rear end of the needle valve 4, and may have the other end connected to a piezo-element 8 (driving mechanism). In such a configuration, damage is restricted merely to the drive pin 13 even if an explosion occurs in the driving mechanism, and damages to the needle valve 4 and to the paint chamber 3 can be prevented.

[Effects of the Invention]

According to the present invention, it is possible to provide a paint discharging nozzle capable of preventing ignition generated from the driving mechanism to the paint chamber.

What is claimed is:

1. A paint discharging nozzle designed for discharging paint supplied at a predetermined pressure, the paint discharging nozzle comprising:
    a housing having a nozzle hole through which paint is discharged;
    a paint chamber to supply paint to the nozzle hole;
    a needle valve retractably or advancingly fitted into the housing to close or open the nozzle hole;
    a driver disposed in the housing to cause the needle valve to perform a retracting or advancing operation with respect to the nozzle hole; and
    a bearing disposed to surround the needle valve within the housing to be in sliding contact with a peripheral surface of the needle valve as the retracting or advancing operation of the needle valve is performed, wherein
    the bearing includes a linear guide disposed rotatably around the needle valve with a plurality of rotators in an axial direction and in a circumferential direction of the needle valve therebetween,
    the bearing is movable at a distance equal to or longer than a circumferential length of one of the plurality of rotators in the axial direction of the needle valve, and
    the plurality of rotators are wholly disposed between the linear guide and the peripheral surface of the needle valve.

2. The paint discharging nozzle according to 1, wherein a backlash, in a space within which the bearing is movable in the axial direction of the needle valve, has a length of at least the circumferential length of the one of the plurality of rotators.

3. The paint discharging nozzle according to claim 1, further comprising:
    a drive pin having one end connected to a tip end of the needle valve on the driver side, wherein
    the other end of the drive pin is connected to the driver.

4. The paint discharging nozzle according to claim 2, further comprising:
    a drive pin having one end connected to a tip end of the needle valve on the driver side, wherein
    the other end of the drive pin is connected to the driver.

5. The paint discharging nozzle according to claim 1, wherein the rotators are spheres.

6. The paint discharging nozzle according to claim 1, wherein the rotators are rollers.

7. The paint discharging nozzle according to claim 1, wherein the driver is disposed in a driver housing space, which is separated from the paint chamber via double O-rings.

8. The paint discharging nozzle according to claim 1, wherein each of the rotators is disposed to rotate with a grease.

9. The paint discharging nozzle according to claim 1, wherein a space is between the bearing and an inner wall of the housing.

10. The paint discharging nozzle according to claim 1, wherein the bearing is disposed in a cylindrical space such that the bearing is movable in the axial direction within the cylindrical space.

11. The paint discharging nozzle according to claim 1, wherein the plurality of rotators are disposed between an inner surface of the linear guide and the peripheral surface of the needle valve, which are parallel to each other.

12. The paint discharging nozzle according to claim 1, wherein the plurality of rotators are disposed between the linear guide and the peripheral surface of the needle valve.

* * * * *